United States Patent [19]

Treinies et al.

[11] Patent Number: 5,732,549
[45] Date of Patent: Mar. 31, 1998

[54] METHOD FOR CHECKING THE CONVERSION CAPABILITY OF A CATALYTIC CONVERTER

[75] Inventors: Stefan Treinies, Neutraubling; Alexander Ketterer, Regensburg; Michael Krauss, München, all of Germany

[73] Assignees: Siemens Aktiengesellschaft; Bayerische Motoren Werke Aktiengesellschaft, both of Munich, Germany

[21] Appl. No.: 666,969

[22] Filed: Jun. 20, 1996

Related U.S. Application Data

[630] Continuation of PCT/EP94/04262, filed on Dec. 21, 1994.

[30] Foreign Application Priority Data

Dec. 21, 1993 [EP] European Pat. Off. .............. 93120626

[51] Int. Cl.⁶ ................................. F01N 3/20; F01N 9/00
[52] U.S. Cl. ................................. 60/274; 60/276; 60/277; 123/674
[58] Field of Search ..................... 60/274, 276, 277; 123/674

[56] References Cited

U.S. PATENT DOCUMENTS

| | | | |
|---|---|---|---|
| 5,060,474 | 10/1991 | Aramaki | 60/277 |
| 5,140,810 | 8/1992 | Kuroda | 60/277 |
| 5,267,439 | 12/1993 | Raff et al. | 60/277 |
| 5,363,646 | 11/1994 | Orzel et al. | 60/274 |
| 5,435,172 | 7/1995 | Pelters et al. | 60/277 |

FOREIGN PATENT DOCUMENTS

| | | | |
|---|---|---|---|
| 26 43 739 | 3/1986 | Germany | 60/277 |
| 41 00 397 A1 | 8/1991 | Germany. | |
| 92 03642 | 3/1992 | WIPO. | |

OTHER PUBLICATIONS

Patent Abstracts of Japan, vol. 14, No. 253, Jun. 9, 1992: including JP-A-4-60106 (Mazda) Feb. 26, 1992.

*Primary Examiner*—Sheldon Richter
*Attorney, Agent, or Firm*—Herbert L. Lerner; Laurence A. Greenberg

[57] ABSTRACT

In a method for checking the conversion capability of a catalytic converter, in particular a precatalytic converter associated with internal combustion engines of motor vehicles, the checking is undertaken through the use of a temperature measurement immediately downstream of the catalytic converter. Initially the temperature at the beginning and at the end of a predetermined idling phase is measured for a predetermined number of idling phases, following an overrun phase in predetermined operating states of a motor vehicle with an internal combustion engine. Then the difference of the temperature measurements for each idling phase is formed. The sum of all of the temperature differences and the sum of the duration of the idling phases are formed and subsequently a quotient of these results is formed. This quotient determines an average gradient. The average gradient determined in this way is compared with a limiting value and the catalytic converter is recognized as defective if the predetermined limiting value is exceeded. The method may be applied to motor vehicles with internal combustion engines.

6 Claims, 2 Drawing Sheets

LAMBDA CLOSED LOOP SYSTEM

FIG.I

METHOD FOR CHECKING THE CONVERSION CAPABILITY OF A CATALYTIC CONVERTER

Cross Reference to Related Application

This application is a Continuation of International Application Serial No. PCT/EP94/04262, filed Dec. 21, 1994.

BACKGROUND OF THE INVENTION

FIELD OF THE INVENTION

The present invention relates to a method for checking the conversion capability of a catalytic converter disposed in the exhaust system of motor vehicles having internal combustion engines, with a temperature measurement being taken in the exhaust system immediately downstream of the catalytic converter, in particular for checking a first or precatalytic converter.

In order to convert noxious components in exhaust gases of internal combustion engines, catalytic converters are used which convert the hydrocarbons, carbon monoxide and nitrogen oxide contained in the exhaust gases into compounds which are harmless in terms of their effect on health. In operation, the catalytic converters are exposed to severe conditions such as high temperatures and vibration and their life is thus limited. During the life of a motor vehicle, that can lead to a reduction in the conversion efficiency of the catalytic converter, necessitating replacement of the catalytic converter.

However, since the legal requirements relating to exhaust gases must be met at all times during the entire period of use, it is necessary to monitor the function of the catalytic converter. The monitoring system therein can indicate to the driver when the catalytic converter is no longer operating satisfactorily, through the use of an optical or acoustic signal.

German Patent DE 26 43 739 C2 has disclosed a method for monitoring the activity of catalytic converters for exhaust gas purification in which two temperature detectors are provided. One temperature detector is disposed in the catalytic converter and the other is disposed just upstream of the catalytic converter. That known method exploits the fact that when the catalytic converter is working properly, there is a temperature increase within the system due to exothermic reactions in the catalytic converter and the catalytic effect measured at the catalytic converter is a measure of the operation of the catalytic converter.

German Published, Non-Prosecuted Patent Application DE 41 00 397 has furthermore disclosed a method and a configuration for monitoring the conversion efficiency of a catalytic converter in which the difference between the temperatures upstream and downstream of the catalytic converter that occur in an overrun phase of the internal combustion engine when an ignition failure is produced and a predetermined quantity of fuel/air mixture is supplied, is detected and evaluated.

SUMMARY OF THE INVENTION

It is accordingly an object of the invention to provide a method for checking or monitoring the conversion capability of a catalytic converter, in particular a precatalytic converter, which overcomes the hereinafore-mentioned disadvantages of the heretofore-known methods of this general type and in which checking or monitoring of the function of the catalytic converter is possible without interfering with the catalytic converter.

With the foregoing and other objects in view there is provided, in accordance with the invention, a method for checking the conversion capability of a catalytic converter disposed in an exhaust system of a motor vehicle having an internal combustion engine, in particular for checking a first catalytic converter or precatalytic converter, which comprises in each case measuring a temperature in the exhaust system immediately downstream of the catalytic converter at a beginning and at an end of a predetermined number of idling reference phases following an overrun phase in predetermined operating states of the motor vehicle and/or the internal combustion engine; forming a difference of the temperature measurements at the beginning and the end of each reference phase; forming a total sum of all of the differences and a time sum from durations of the reference phases; forming an average temperature gradient from the total sum and the time sum; comparing the average temperature gradient with a predetermined limiting value; and determining or recognizing that the catalytic converter is defective if an average temperature quotient exceeds the limiting value.

In accordance with another mode of the invention, there is provided a method which comprises determining if at least some of the following operating states are present: activation of a lambda closed-loop control system; non-activation of secondary air operation; an operating temperature of the internal combustion engine is in a correct range; a vehicle speed of the motor vehicle is lower than a maximum value upon entry into the idling phase; conditions of steady-state operation hold for a predetermined period before entry into the overrun phase; and a calculated catalytic converter equivalent temperature is in a predetermined temperature range.

In accordance with a further mode of the invention, there is provided a method which comprises preceding the idling phase in each case with an overrun phase with injection switched off.

In accordance with an added mode of the invention, there is provided a method which comprises evaluating the operating states in a computer and determining the beginning of checking with the computer.

In accordance with a concomitant mode of the invention, there is provided a method which comprises evaluating the operating states in an existing engine controller and determining the beginning of checking with the engine controller.

Due to the transition from an operating point with a relatively high load and engine speed, through an overrun phase (cooling by oxygen), to an idling phase (an operating point with a low load and engine speed), there is a fundamental drop in the exhaust-gas temperature. The catalytic converter has a certain storage effect with regard to the temperature and conversion, with the result that this drop in the temperature is measured with a certain time delay downstream of the catalytic converter.

The difference in the temperature characteristic of a good catalytic converter and a defective catalytic converter is only very small. A significant difference can only be detected at the beginning of an idling phase which follows directly from an overrun phase with the injection switched off, since in this case there is a strongly exothermic reaction when injection recommences due to the oxygen supplied in the overrun phase. Due to the smallness of the difference, the conditions prevailing before and during the individual measurements should furthermore be stable and identical in every case. Extremely reliable criteria for assessing the conversion capability of a catalytic converter can be obtained if in each case a plurality of measurements are taken in a predetermined time interval and used to form an average, which is then compared with a limiting value.

The method can be applied with particular advantage to the first catalytic converter in the exhaust system of a motor vehicle. This can expediently be formed by a precatalytic converter since, as tests have shown, particularly reliable measurement results can be obtained through the use of the method according to the invention in the case of a catalytic converter which does not exceed a certain size.

Since, as already mentioned, stable and virtually identical conditions should prevail during the measurements and disturbing influences should be avoided, the determination of the temperature gradient is advantageously carried out in certain operating states.

The checking of the catalytic converter should only take place when a lambda closed-loop control system is active. This avoids disturbances due to the effects of the mixture. Combustion in the internal combustion engine is stable following the reactivation of an overrun cut-off.

A check should furthermore only be carried out when no secondary air is being injected into the catalytic converter. Secondary air injection is carried out to ensure rapid light-off of the catalytic converter. At this point in time, the catalytic converter has not yet reached its operating temperature. Moreover, the mixture upstream of the catalytic converter is lean in this case and the catalytic converter is thus not operating. The check must only be carried out when the temperature of the catalytic converter is in the temperature range that is optimum for conversion. The temperature of the catalytic converter can be determined by calculating using an exhaust-gas temperature model stored in the engine controller.

Conditions are also unstable or transient when the internal combustion engine has not yet reached its operating temperature. This can be ascertained from the temperature of the cooling water, which should have a certain minimum value for checking of the catalytic converter to begin.

In order to obtain stable conditions and therefore a reliable measurement, the traveling speed of the motor vehicle should also be in a certain range. The traveling speed results in different levels of cooling at different speeds and this influence should thus be suppressed in order to obtain identical conditions during checking.

With regard to conversion and temperature characteristics, the catalytic converter has a storage effect. It is expedient if virtually steady-state conditions have prevailed before the overrun phase in order to avoid measuring any temperature changes, during checking, which are attributable to processes occurring before the overrun phase.

Other features which are considered as characteristic for the invention are set forth in the appended claims.

Although the invention is illustrated and described herein as embodied in a method for checking the conversion capability of a catalytic converter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
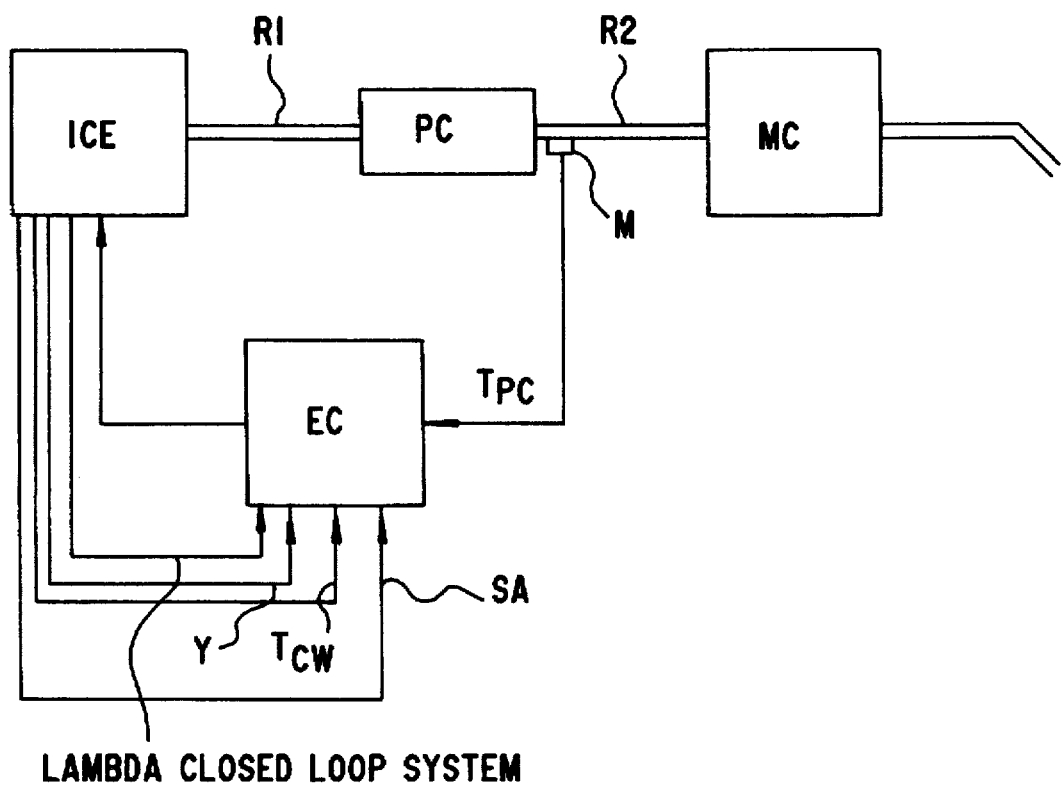
FIG. 1 is a block circuit diagram showing an internal combustion engine with an exhaust system.

Referring now to the figures of the drawings in detail and first, particularly, to FIG. 1 thereof, there is seen a block diagram of an internal combustion engine ICE, which is connected by a first exhaust pipe R1 to a precatalytic converter PC and then by a second exhaust pipe R2 to a main catalytic converter MC. A measuring point M is provided immediately downstream of the precatalytic converter PC for measuring an exhaust-gas temperature downstream of the precatalytic converter. A measured value $T_{PC}$ measured at this point M, together with other measured values, is supplied for evaluation to a computer such as an engine controller EC, in which predetermined procedures are carried out. The other measured values may, for instance, be a secondary air value SA, a temperature of the cooling water $T_{CW}$ and a speed V.

Figure 2:
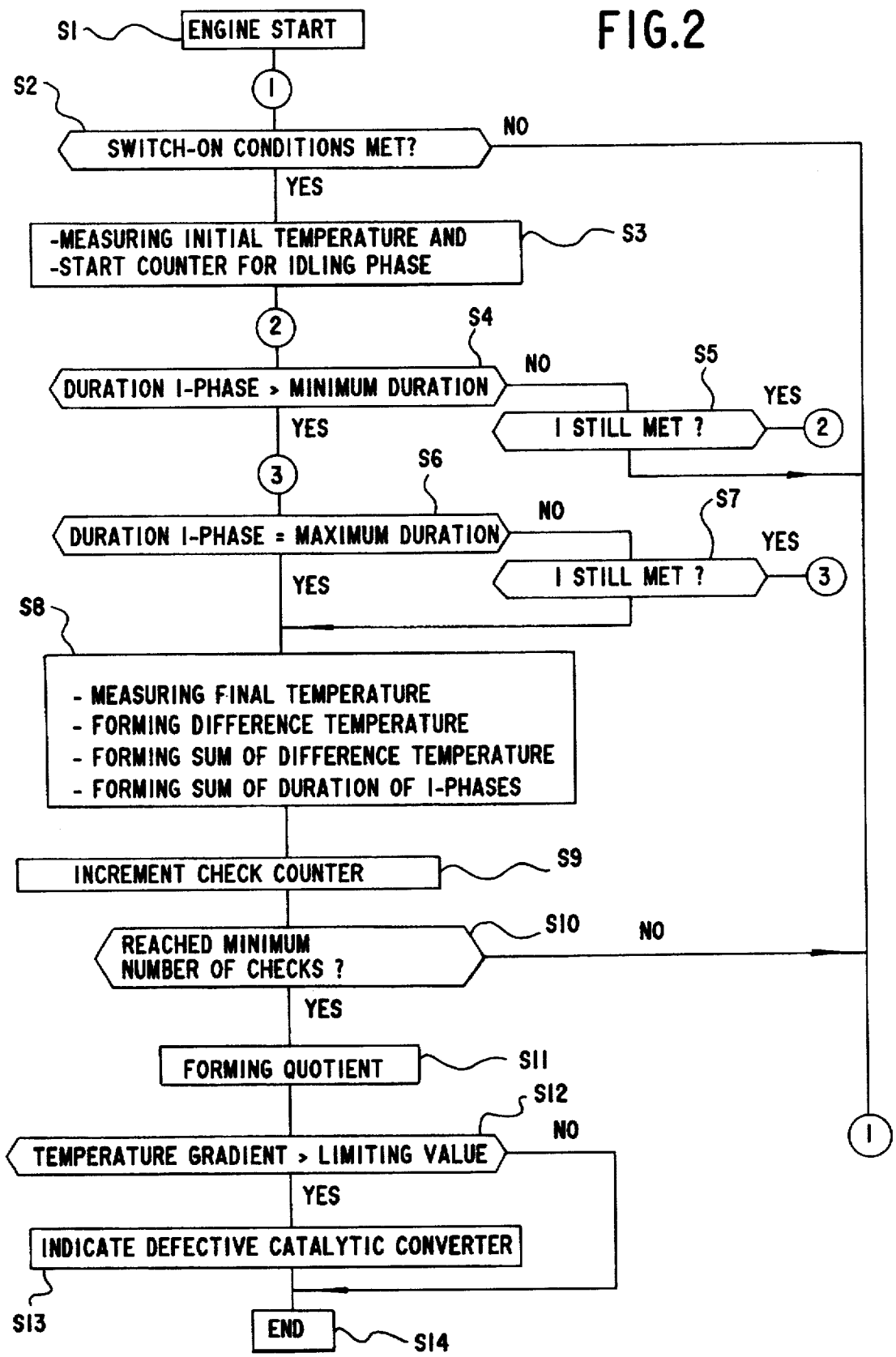
FIG. 2 is a flow diagram illustrating the method according to the invention.

In the flow diagram shown in FIG. 2, the internal combustion engine is started in a first step S1. In a following step S2, the system checks whether or not switch-on conditions for checking the catalytic converter have been met. These include the following operating conditions: whether or not a lambda closed-loop control system is active, whether or not secondary-air operation is not active, whether or not an operating temperature of the internal combustion engine has been reached, whether or not a traveling speed of the motor vehicle is within a predetermined range and whether or not the conditions of steady-state operation before entry into an overrun phase have been met. If this is not the case, the routine returns to 1. If the switch-on conditions have been met, the routine progresses to a step S3, where a temperature (initial temperature) at the beginning of an idling phase (I phase) following overrun operation is measured. At the same time, a counter for the duration of the idling phase is started. In a following step S4, a decision is made as to whether or not the duration of the idling phase is longer than a minimum duration. If the decision is "No", the routine progresses to a step S5, where the system checks whether or not the condition for idling is still met. If the decision is "Yes", the routine returns to 2. If the decision is "No", the routine returns to the beginning of the routine, i.e. to 1. If the duration of the idling phase is greater than the minimum duration, the routine progresses to a decision step S6, where a decision is made as to whether or not the duration of the idling phase is equal to a maximum duration. If the decision at S6 is "No", the routine progresses to a step S7, where a decision is made as to whether or not the condition for idling is still met. If the decision at S7 is "Yes", the routine returns to 3. If the decision is "No", the routine progresses to a step S8.

If the decision at S6 is "Yes", the routine progresses immediately from the step S6 to the step S8. In this step S8, the temperature at the end of the idling phase is measured. The difference between the final temperature and the initial temperature is furthermore determined and all of the differences are added. In this step, the total duration of all of the idling phases is determined. In a step S9, a check counter is incremented. In a following step S10, a decision is made as to whether or not a minimum number of checks has been reached. If this is not the case, the routine returns to 1. If the minimum number of checks has been reached, a quotient of the total of the measurement results for the differential temperature and the total duration of the measurements is formed in order to obtain a resulting temperature gradient. In a following step S12, a decision is made as to whether or not the resulting temperature gradient is greater than a limiting value. If the decision is "Yes", the catalytic converter is defective or no longer meets its minimum requirements, which is indicated in a step S13. If the decision in the step S12 is "No", the routine progresses to an end step S14.

Checking is generally carried out once per engine run.

We claim:

1. A method for checking the conversion capability of a catalytic converter disposed in an exhaust system of a motor vehicle having an internal combustion engine, which comprises:

a) measuring a temperature in the exhaust system immediately downstream of the catalytic converter at a beginning and at an end of a predetermined number of idling reference phases following an overrun phase in predetermined operating states of at least one of the motor vehicle and the internal combustion engine;

b) forming a difference of the temperature measurements at the beginning and the end of each reference phase;

c) forming a total sum of all of the differences and a time sum from durations of the reference phases;

d) forming an average temperature gradient from the total sum and the time sum;

e) comparing the average temperature gradient with a predetermined limiting value; and f) determining that the catalytic converter is defective if an average temperature quotient exceeds the limiting value.

2. The method according to claim 1, which comprises determining if at least some of the following operating states are present:

a) activation of a lambda closed-loop control system;

b) non-activation of secondary air operation;

c) an operating temperature of the internal combustion engine is in a correct range;

d) a vehicle speed of the motor vehicle is lower than a maximum value upon entry into the idling phase;

e) conditions of steady-state operation hold for a predetermined period before entry into the overrun phase; and f) a calculated catalytic converter equivalent temperature is in a predetermined temperature range.

3. The method according to claim 1, which comprises preceding the idling phase in each case with an overrun phase with injection switched off.

4. The method according to claim 1, which comprises evaluating the operating states in a computer and determining the beginning of checking with the computer.

5. The method according to claim 1, which comprises evaluating the operating states in an existing engine controller and determining the beginning of checking with the engine controller.

6. A method for checking the conversion capability of a precatalytic converter disposed in an exhaust system of a motor vehicle having an internal combustion engine, which comprises:

a) measuring a temperature in the exhaust system immediately downstream of the precatalytic converter at a beginning and at an end of a predetermined number of idling reference phases following an overrun phase in predetermined operating states of at least one of the motor vehicle and the internal combustion engine;

b) forming a difference of the temperature measurements at the beginning and the end of each reference phase;

c) forming a total sum of all of the differences and a time sum from durations of the reference phases;

d) forming an average temperature gradient from the total sum and the time sum;

e) comparing the average temperature gradient with a predetermined limiting value; and f) determining that the precatalytic converter is defective if an average temperature quotient exceeds the limiting value.

* * * * *